United States Patent
Zaki et al.

(10) Patent No.: US 7,735,670 B2
(45) Date of Patent: Jun. 15, 2010

(54) OXYGEN REMOVAL SYSTEM

(75) Inventors: Rehan Zaki, Naperville, IL (US); Peter M. Michalakos, Chicago, IL (US)

(73) Assignee: Honeywell International Inc., Morristown, NJ (US)

( * ) Notice: Subject to any disclaimer, the term of this patent is extended or adjusted under 35 U.S.C. 154(b) by 869 days.

(21) Appl. No.: 11/550,066

(22) Filed: Oct. 17, 2006

(65) Prior Publication Data

US 2008/0099618 A1 May 1, 2008

(51) Int. Cl.
- *B65D 90/44* (2006.01)
- *B65D 90/22* (2006.01)
- *B64D 37/02* (2006.01)
- *B64D 37/32* (2006.01)

(52) U.S. Cl. .............. 220/88.3; 244/135 R; 261/DIG. 2

(58) Field of Classification Search ............. 244/135 R, 244/135 B; 220/88.3; 95/54; 261/DIG. 2; 55/385.3; 96/155, 156

See application file for complete search history.

(56) References Cited

U.S. PATENT DOCUMENTS

| | | | |
|---|---|---|---|
| 3,847,298 A | 11/1974 | Hamilton | |
| 4,556,180 A * | 12/1985 | Manatt | 244/135 R |
| 6,585,192 B2 * | 7/2003 | Beers | 244/135 R |
| 6,843,269 B2 | 1/2005 | Verma et al. | |
| 2002/0028168 A1 | 3/2002 | Giacobbe et al. | |
| 2008/0199376 A1 * | 8/2008 | Limaye et al. | 423/213.2 |

OTHER PUBLICATIONS

Limaye, Santosh Y., Next Generation OBIGGS: Developments at Phyre Technologies, Nov. 2, 2005 presentation, Atlantic City, NJ.

* cited by examiner

*Primary Examiner*—Rob Swiatek
(74) *Attorney, Agent, or Firm*—Oral Caglar, Esq.

(57) ABSTRACT

A system and process to deplete or remove oxygen in the ullage of a fuel tank to reduce the oxygen/fuel vapor ratio below a lower explosion limit by exposing the ullage compounds to an oxygen removal catalyst active at a relatively low temperature. The oxygen removal catalyst may be a non-precious metal catalyst. A selective reaction of the oxygen by the catalyst forms primarily alcohols, aldehydes, and/or ketones and produces less than about 5% water by volume. The selective reaction, occurring at the relatively low temperature, reduces the risk of flammability of the fuel.

19 Claims, 3 Drawing Sheets

OXYGEN REMOVAL SYSTEM

BACKGROUND OF THE INVENTION

This invention relates to an oxygen depletion and removal system (ORS) and a nitrogen generating system (NGS). This invention also relates to an on board inert gas generation system (OBIGGS), flammability reduction system (FRS), nitrogen generating system (NGS), and fuel tank inerting system (FTIS).

There are risks associated with the flammability of a fuel tank ullage composition. One approach to reducing the risk is to supply inert gas into the fuel tank. This reduces the oxygen concentration in the ullage and achieves an oxygen/fuel vapor ratio below the lower explosion limit (LEL).

Two ways to supply inert gas are by: 1) generating a nitrogen-enriched air (NEA) stream from outside air using an air separation membrane; and 2) generating a carbon dioxide stream from fuel. The first approach of using a membrane requires heavy, expensive membrane modules that require high pressure, cool, filtered air to operate efficiently. High pressure air is obtained from dedicated compressors, which add weight and use power; or from engine bleed air, which incurs a fuel penalty for the airplane. Cooling the air may require heat exchangers. Filtering the air requires removal of ozone and liquid and solid particulates by filters that require replacement.

The second approach, using $CO_2$ has certain disadvantages. The production of $CO_2$ consumes fuel. The fuel may also contain sulfur, which may form corrosive sulfur oxides. The production of $CO_2$ from fuel also produces water, which needs to be removed from the carbon dioxide stream before being returned to the fuel tank. The second approach may also require a heater to operate efficiently.

The prior art includes a process discussed at a presentation in New Jersey on 2 Nov. 2005, titled *Next Generation OBIGGS: Developments at Phyre Technologies*. This process reduces oxygen content in the fuel tank by using oxygen as an oxidizing agent to produce $CO_2$ and water. The process involves high temperature for catalytic oxidation and, as a result, a heat exchanger is needed to reduce the heating requirement and to cool the product before entering the fuel tank.

U.S. Pat. No. 3,847,298 ("the '298 patent") discloses the inerting of aircraft ullage by catalytic oxidation of liquid fuel with bleed air. FIG. 1 of the '298 patent illustrates the general process. A reactor is used to produce gas such as $CO_2$ and $H_2O$. The gas is then cooled by a cooling system or gas cooler. After the gas is cooled, it enters a moisture remover to remove $H_2O$ before the gas is recycled back to the fuel tank. The catalytic reaction occurs at high temperature —"500°/600° F."—as described at column 3, line 10 of the '298 patent. Moreover, the reactor operates in an open loop using engine bleed air to react with fuel from the tank.

U.S Patent Publication No. 2002/0028168 discloses inert gas production by combustion of an organic hydrocarbon fuel. This production is in an internal combustion engine followed by a catalytic process to substantially remove oxygen. As shown in FIG. 1, an exhaust stream from the engine passes through a heat exchanger to cool the exhaust gas, and the cooled exhaust gas stream is compressed with a compressor. The compressed gas is then heated and additional fuel is introduced into the exhaust gas stream. The heated and pressurized exhaust gas stream is then passed through a packed bed catalytic system to convert oxygen in the exhaust gas to $CO_2$ and water vapor and thus produce inert gas containing less than 1000 ppm of oxygen.

As can be seen, there is a need for a low temperature, closed loop flow circuit that draws the ullage from the tank and passes the flow through the catalyst. There is also a need for use of a lighter, smaller catalyst; and a more cost-efficient way to reduce the oxygen/fuel vapor ratio in a fuel tank ullage that does not generate undesired by-products or use high pressures or temperatures, and does not create a fuel penalty by consuming fuel or using engine bleed air.

SUMMARY OF THE INVENTION

One aspect of the present invention is a method of removing oxygen from a fuel tank, comprising the steps of maintaining an oxygen removal catalyst at a temperature of less than 500° F. and preferably less than about 3000° F.; displacing fuel vapor and oxygen-rich air from the fuel tank to said oxygen removal catalyst; discharging oxygenated fuel and oxygen-poor air from said oxygen removal catalyst to the fuel tank, whereby said oxygenated fuel and oxygen-poor air includes alcohols, aldehydes, and ketones, and other oxygenated compounds.

Another aspect of the present invention is an oxygen removal process for a fuel tank, comprising an oxygen removal catalyst having a catalyst input connected to a fuel tank outlet and a catalyst output connected to a fuel tank input; the oxygen removal catalyst capable of a relatively low temperature selective consumption of oxygen so as to form one or more of an alcohol, an aldehyde, a ketone, or another oxygenated compound; and a pressurizing member disposed between the fuel tank outlet and the catalyst input, the pressurizing member capable of displacing vapor from an ullage region of the fuel tank into the oxygen removal catalyst, and out from the oxygen removal catalyst to the ullage region.

Yet another aspect of the present invention is an oxygen removal system, comprising a fuel tank having an ullage region; and an oxygen removal catalyst for receiving fuel vapor and air from the ullage region; the oxygen removal catalyst being capable of a low temperature selective consumption of oxygen to produce oxygenated fuel and oxygen-poor air and providing the oxygenated fuel and oxygen-poor air to the ullage region; and; a blower for displacing the fuel vapor and air from the ullage region to the oxygen removal catalyst and for displacing the oxygenated fuel and oxygen-poor air from the oxygen removal catalyst to the ullage region.

These and other features, aspects and advantages of the present invention will become better understood with reference to the following drawings, description and claims.

DETAILED DESCRIPTION OF THE INVENTION

Figure 1:
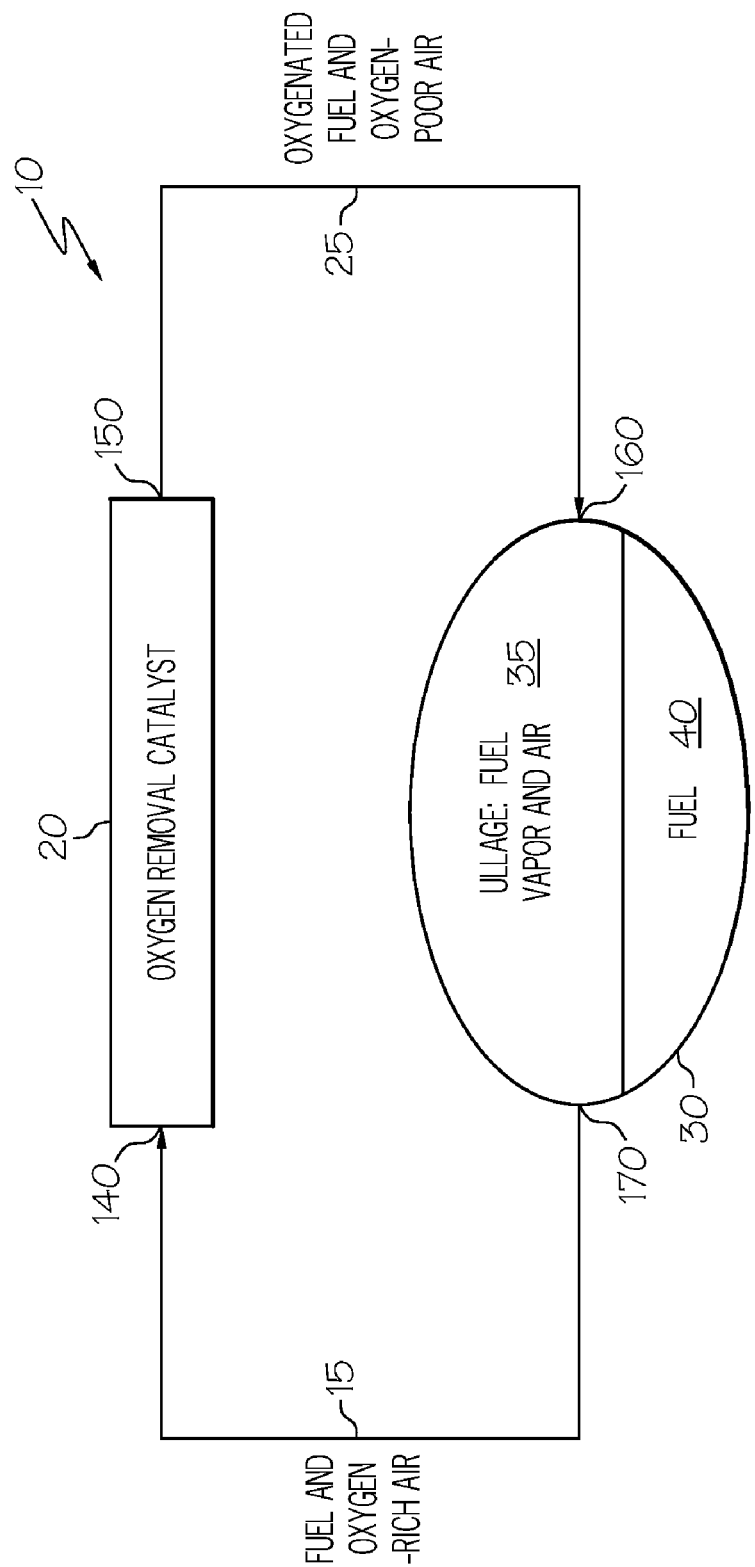
FIG. 1 illustrates a schematic of an embodiment of an oxygen removal system of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be used in aircraft to reduce the risk of fuel tank ullage flammability by use of a relatively low temperature catalytic reaction. The present invention removes oxygen from the ullage in the fuel tank, and thus reduces the oxygen/fuel vapor ratio below the LEL. Alternative uses of the present invention include incorporation with underground fuel tanks and oil tankers.

The present invention differs from the prior art by, among other things, the use of a catalyst that is capable of a relatively low temperature, selective consumption of oxygen, thereby forming alcohols, aldehydes, and ketones or other oxygenated compounds. This catalyst may be referred to as an oxygen removal catalyst. The oxygen removal catalyst may be a packed bed or washcoated monolith. Because operation is at a lower temperature, alcohols, aldehydes, and ketones or other oxygenated compounds are produced rather than $CO_2$ and a larger amount of water than in a reaction using a conventional high temperature system. Thus, rather than the catalyst producing $CO_2$ and water as in the prior art, the combination of the lower temperature and the catalyst of the present invention produces alcohols, aldehydes, and ketones or other oxygenated compounds. This system operates at temperatures under 500° F. and preferably under 300° F. to enable a catalyst to chemically convert fuel vapor and oxygen-rich air into oxygenated fuel vapor and oxygen-poor air for return to the fuel tank.

An oxygen removal mechanism of the present invention may be a selective consumption, or reaction, of oxygen by fuel. The consumption takes place at a temperature of, generally, under 200° F., and in the presence of a non-precious metal catalyst. The consumption forms alcohols, aldehydes, and ketones or other oxygenated compounds instead of carbon dioxide, which retain significantly more fuel value of the original fuel vapor than the prior art. This process will also minimize water formation, so that a water trap is not needed.

The system of the present invention functions to maintain a higher percentage of alcohols, aldehydes, and ketones or other oxygenated compounds than of $CO_2$ in the reaction products. This minimization of water formation may be defined as the production of only about 2% to about 5% water by volume; as opposed to the prior art, which may produce as much as 14% water by volume. The product stream, consisting of the alcohols, aldehydes, ketones, or other oxygenated compounds, and the about 2% to about 5% water will then replace the oxygen-rich fuel vapor in the ullage. Oxygen-rich vapor may be defined as comprising over 12% oxygen; oxygen-poor vapor may be defined as comprising 12% or less oxygen. This process may, in some instances, also be able to eliminate the need for a heat exchanger or heater because of the relatively low temperatures of operation.

FIG. 1 is a general schematic that illustrates an embodiment of an oxygen removal system 10 of the present invention in which a fuel and oxygen-rich air stream 15 may be removed from the fuel tank ullage 35 of a fuel tank 30 containing fuel 40. The ullage 35 may comprise fuel vapor and air.

The fuel vapor and oxygen rich air stream 15 may exit the fuel tank 30 via a fuel tank outlet 170 and pumped to an oxygen removal catalyst 20 via a catalyst input 140. This may be performed by a pump, also referred to herein as a pressurizing member (not illustrated).

The resultant products caused by the oxygen removal catalyst 20 are oxygenated fuel and oxygen-poor air 25. This oxygenated fuel and oxygen-poor air 25 may be expelled from the catalyst 20 via a catalyst output 150, and delivered to the fuel tank ullage 35 via a fuel tank inlet 160.

The catalyst 20 can be active at a relatively low temperature, such as between about 72° F. and about 200° F. in comparison to the prior art, in which the catalyst temperature required for operation may be over 230° F. for the complete oxidation to form $CO_2$.

In one exemplary embodiment, the oxygen removal catalyst 20 may be a catalyst that can be capable of a selective or mild oxidation reaction, i.e. not complete oxidation. This incomplete oxidation may be a consequence of the relatively low temperature of the process and the type of catalyst employed.

For example, the oxygen removal catalyst 20 may be a base metal catalyst, such as one containing iron, nickel, lead, or zinc. However, a precious metal catalyst may also be used, such as one containing gold, silver, or palladium. The form of the oxygen removal catalyst 20 may be either a packed bed, or wash-coated monolith, or a combination of both.

The selective oxidation is that of hydrocarbons to form selective oxidation products, such as alcohols, and minimizing the formation of carbon dioxide and water. Although any conventional or typical fuel may be used, an example of such an oxidation reaction using decane as the representative fuel vapor compound is:

$$C_{10}H_{22} + \tfrac{1}{2} O_2 \rightarrow C_{10}H_{21}OH \quad (1)$$

The extent of oxygen consumption required to provide inerting of the ullage 35 in the tank may be a reduction to 12% $O_2$ from 21% $O_2$, or a consumption of 90,000 ppmv of $O_2$. In the above reaction (1), 180,000 ppmv of decane may be reacted. If the vapor pressure of the fuel is such that less than this amount of fuel is available, the extent of oxidation may be increased (e.g. so that diols or other compounds with higher oxygen content are formed); or, liquid fuel may be used to consume the requisite amount of oxygen. In one exemplary embodiment, the oxygen removal system 10 can maintain the percentage of oxygen in the ullage 35 to be less than a predetermined lower explosion limit, such as 12%.

In one exemplary embodiment of the present invention, the oxygen removal system 10 may operate continuously. In another exemplary embodiment of the present invention, the oxygen removal system 10 may operate intermittently, depending on how much and how quickly oxygen needs to be removed from the ullage 35.

Figure 2:
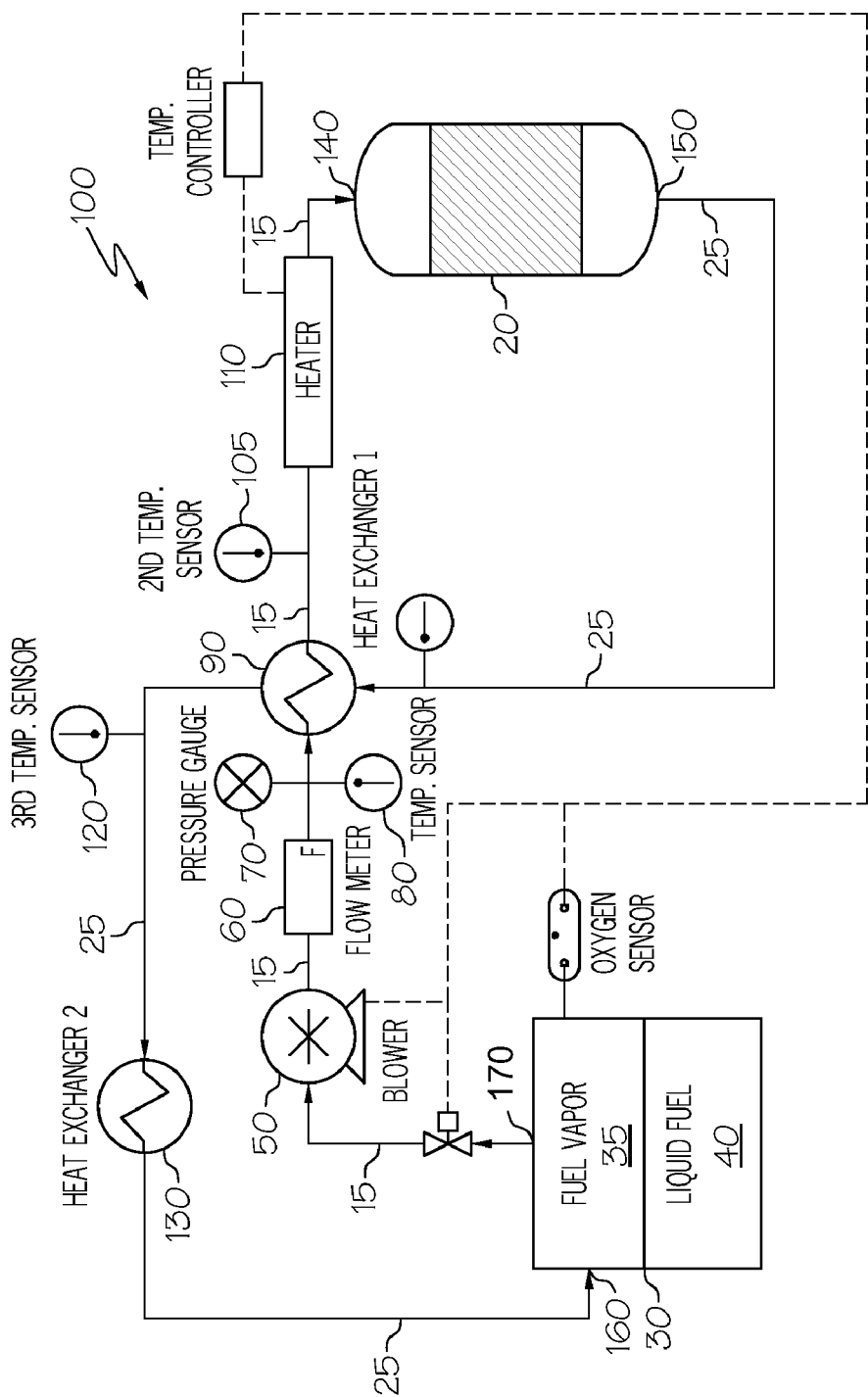
FIG. 2 illustrates a schematic of another embodiment of an oxygen removal system of the present invention.

FIG. 2 illustrates another embodiment of an oxygen removal system 100 of the present invention in which the system may, in contrast to the embodiment of FIG. 1, have additional components for monitoring the temperature and pressure of the flow of the fuel and oxygen-rich air 15 and the oxygenated fuel and oxygen-poor air 25 (or fluid), and for providing heat transfer as needed to improve the efficiency of the oxygen removal system 100. FIG. 2 shows the fuel and oxygen-rich air 15 that leaves the ullage 35 via the fuel tank outlet 170, and is routed to the oxygen removal catalyst 20 via the catalyst input 140. After activation by the oxygen removal catalyst 20, oxygenated fuel and oxygen-poor air 25 may leave the oxygen removal catalyst 20 via a catalyst output 150, and may then be routed back to the ullage 35 via a fuel tank inlet 160.

However, unlike the embodiment as shown in FIG. 1, the fuel and oxygen-rich air 15 may exit the fuel tank outlet 170 and may be initially routed to a pump or blower 50 to displace the fuel vapor and oxygen-rich air 15. Then, the fuel and oxygen-rich air 15 may be displaced from the blower 50 and may be routed to a flow meter 60 to monitor the displaced volume of the fluid. Then, the fuel and oxygen-rich air 15 may be displaced from the flow meter 60 and may be routed to a pressure gauge 70 and a first temperature sensor 80 to evaluate the temperature of the fuel vapor and oxygen-rich air 15.

Then, the fuel vapor and oxygen-rich air 15 may be displaced from the pressure gauge 70 and it may be routed to a first heat exchanger 90 to allow heat to transfer from the oxygenated fuel and oxygen poor air 25 to fuel and oxygen-rich air 15, to increase the temperature of the fuel and oxygen-rich air 15. Then, the fuel and oxygen-rich air 15 may be displaced from the first heat exchanger 90 and it may be routed to a second temperature sensor 105 to check the temperature of the fuel vapor and oxygen-rich air 15. Then, the fuel and oxygen-rich air 15 may be displaced from the second temperature sensor 105 and it may be routed to a heater 110 to heat the fuel vapor and oxygen-rich air 15, before entering the oxygen removal catalyst 20 via the catalyst input 140.

After being displaced from the oxygen removal catalyst 20, the oxygenated fuel and oxygen-poor air 25 may be routed to the first heat exchanger 90 to remove heat from the oxygenated fuel and oxygen-poor air 25. After being displaced from the first heat exchanger 90, the oxygenated fuel and oxygen-poor air 25 may be routed to a third temperature sensor 120 to evaluate the temperature thereof.

After being displaced from the third temperature sensor 120, the oxygenated fuel and oxygen-poor air 25 may be routed to a second heat exchanger 130 to remove heat from the oxygenated fuel and oxygen-poor air 25. After being displaced from the second heat exchanger 130, the oxygenated fuel and oxygen-poor air 25 may be routed to the ullage 35 via the fuel tank inlet 160. Optionally, additional temperature controllers, oxygen sensors, and temperature sensors may be operatively disposed throughout the oxygen removal system 10 as needed.

The temperature of the ullage 35 that is removed from the fuel tank 30 may be about 80° F. under certain environmental conditions. If the present invention uses an oxygen removal catalyst 20 in which the preferred operating temperature of the catalytic reactor in the oxygen removal catalyst 20 is about 100° F., for example, then the optional heater 110 may be used to optimize performance of the oxygen removal catalyst 20 by raising the temperature of the catalytic reactor to the preferred operating temperature. However, it should be understood that the present invention does not necessarily require a heater for operation as described above. In a further exemplary embodiment of the present invention, the oxygen removal catalyst 20 may operate in combination with either or both of the first heat exchanger 90 and the second heat exchanger 130.

Figure 3:
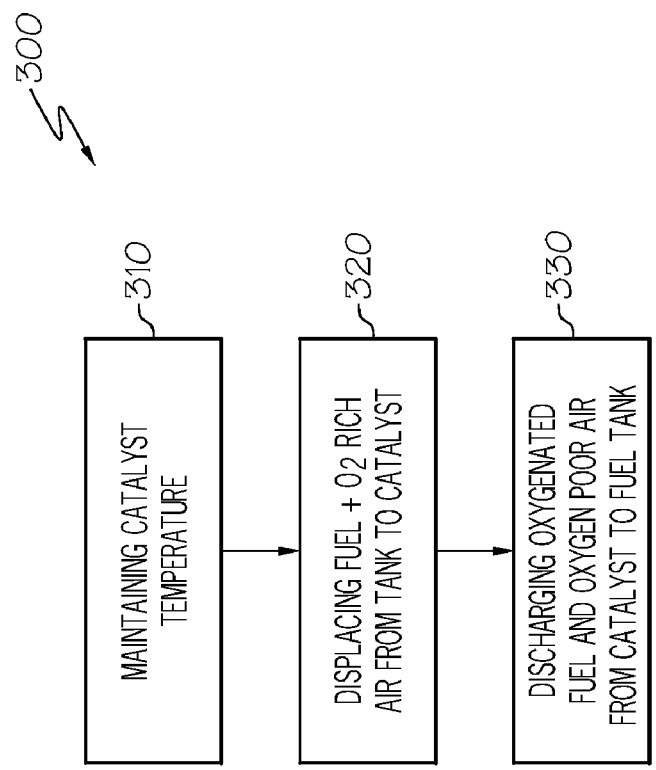
FIG. 3 is a flow diagram illustrating operation of the oxygen removal system of FIG. 1.

FIG. 3 illustrates an exemplary method 300 of the present invention. A first step 310 may be maintaining an oxygen removal catalyst 20 at a temperature of less than about 200° F. A second step 320 may be displacing fuel vapor and oxygen-rich air 15 from the fuel tank 30 to the oxygen removal catalyst 20. A third step 330 may be discharging oxygenated fuel and oxygen-poor air 25 from the oxygen removal catalyst 20 to the fuel tank 30. The oxygenated fuel and oxygen-poor air 25 may include alcohols, aldehydes, and ketones.

It should be understood, of course, that the foregoing relates to exemplary embodiments of the invention and that modifications may be made without departing from the spirit and scope of the invention as set forth in the following claims.

We claim:

1. A method of removing oxygen from ullage of a fuel tank, comprising the steps of:
   maintaining an oxygen removal catalyst at a temperature of less than a pre-determined temperature;
   displacing fuel vapor and oxygen-rich air from the fuel tank to said oxygen removal catalyst to produce a vapor output comprising about 2% to about 5% by volume of water;
   discharging the vapor output, from said oxygen removal catalyst to the fuel tank.

2. The method of claim 1, wherein said oxygen removal catalyst functions to maintain a higher percentage by volume of alcohols, aldehydes and ketones than of $CO_2$ in the reaction products at a temperature of less than 300° F.

3. The method of claim 1, wherein the percentage of oxygen in the ullage is maintained at less than a pre-determined lower explosion limit, and said pre-determined temperature is less than about 300° F.

4. The method of claim 1, wherein the percentage of oxygen in the ullage is maintained at 12% or less, and said pre-determined temperature is less than about 300° F.

5. The method of claim 1, wherein the oxygen removal catalyst comprises a non-precious metal catalyst, and said pre-determined temperature is less than about 300° F.

6. An oxygen removal system for a fuel tank, comprising:
   an oxygen removal catalyst having a catalyst input connected to a fuel tank outlet, said oxygen removal catalyst having a catalyst output connected to a fuel tank input;
   said oxygen removal catalyst being at a temperature below 200° F. for selective consumption of oxygen so as to form reacted products in the form of vapor the majority of which are one or more of an alcohol, an aldehyde and a ketone or another oxygenated compound, wherein the vapor comprises about 2% to about 5% by volume of water; and
   a pressurizing member disposed between said fuel tank outlet and said catalyst input, said pressurizing member capable of displacing vapor from an ullage region of the fuel tank into said oxygen removal catalyst, and out from said oxygen removal catalyst to said ullage region.

7. The oxygen removal system of claim 6, wherein the oxygen to fuel vapor ratio in the ullage is maintained at less than 12% oxygen.

8. The oxygen removal system of claim 6, wherein the vapor displacement operates in a continuous closed loop.

9. The oxygen removal system of claim 6, wherein the vapor displacement operates intermittently.

10. The oxygen removal system of claim 6, further comprising a pressurizing member for displacing the vapor at various rates dependent upon the oxygen percentage in the ullage region.

11. An oxygen removal system, comprising:
    a fuel tank having an ullage region;
    an oxygen removal catalyst for receiving fuel vapor and air from said ullage region; said oxygen removal catalyst further being capable of a low temperature selective consumption of oxygen to produce oxygenated fuel and oxygen-poor air and about 2% to about 5% by volume of water; said oxygen removal catalyst further for providing said oxygenated fuel and oxygen-poor air to said ullage region;
    a blower for displacing said fuel vapor and air from said ullage region to said oxygen removal catalyst and for displacing said oxygenated fuel and oxygen-poor air from said oxygen removal catalyst to said ullage region; and
    wherein the system does not have a water trap.

12. The oxygen removal system of claim 11, further comprising a heat exchanger operably connected with at least one of said fuel vapor or said oxygen poor air.

13. The oxygen removal system of claim 11, wherein said oxygen removal catalyst is active at a temperature below 200° F.

14. The oxygen removal system of claim 11, wherein said oxygen removal catalyst is active at temperatures between about 72° F. and about 200° F.

15. The oxygen removal system of claim 11, wherein the oxygen removal catalyst comprises a non-precious metal.

16. The oxygen removal system of claim 11, further comprising at least one of a heat exchanger, a temperature sensor, a pressure gauge, and an oxygen sensor operably connected within said system.

17. The oxygen removal system of claim 11, wherein said oxygen removal catalyst comprises a packed bed.

18. The oxygen removal system of claim 11, wherein said oxygen removal catalyst comprises a washcoated monolith.

19. The oxygen removal system of claim 11, wherein said oxygen removal catalyst operates to form selective oxidation products from hydrocarbons.

* * * * *